Feb. 17, 1942.   E. L. KRIEG   2,273,579
REEL
Filed March 20, 1941   2 Sheets-Sheet 1

Inventor
Eldon L. Krieg
By Clarence A. O'Brien
Attorney.

Feb. 17, 1942.    E. L. KRIEG    2,273,579
REEL
Filed March 20, 1941    2 Sheets-Sheet 2
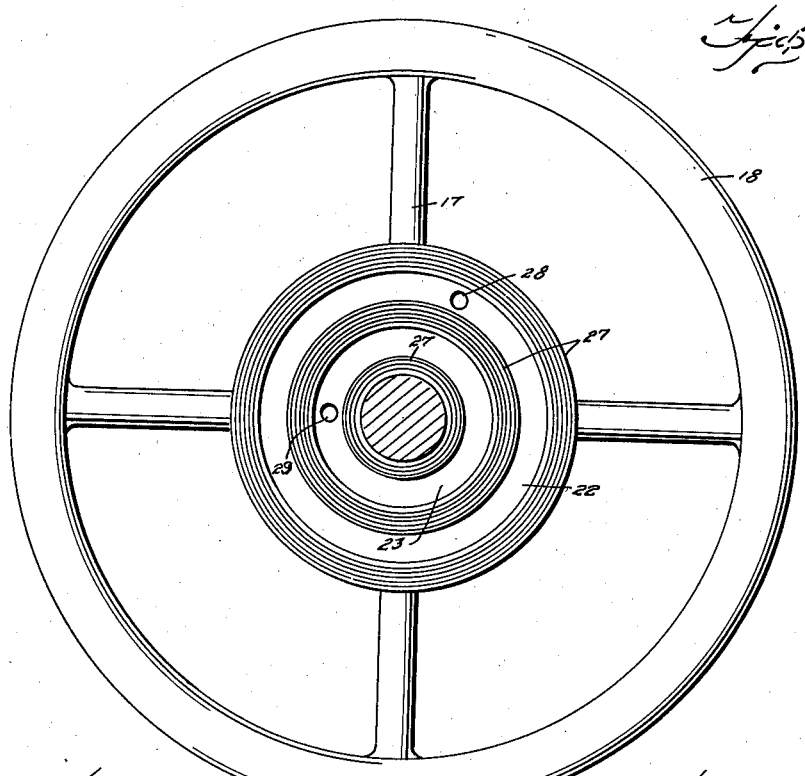
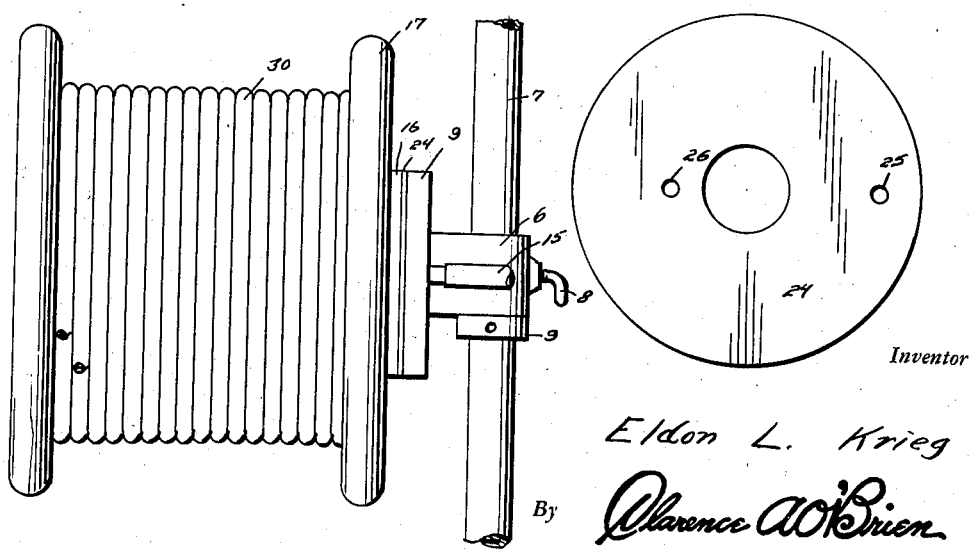
Inventor
Eldon L. Krieg
By Clarence A. O'Brien
Attorney Patented Feb. 17, 1942

2,273,579

UNITED STATES PATENT OFFICE 2,273,579

REEL

Eldon L. Krieg, South Whitley, Ind.

Application March 20, 1941, Serial No. 384,422

3 Claims. (Cl. 299—78)

This invention relates to reels for the support of hose of welding apparatus of the portable character, and has for the primary object the provision of a device which may be easily and quickly mounted on a welding apparatus and moved into various workable positions and secured in any one of the positions and is constructed to accommodate a pair of hose necessary in acetylene welding, one hose conveying oxygen and the other hose conveying acetylene gas from the supplies on the apparatus to the welding torch, the device being provided with a non-leakable rotatable connection for connecting the hose to the sources or supplies and which is necessary for permitting winding of the hose on and off of the device.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is an end elevation illustrating a reel constructed in accordance with my invention.

Figure 2 is a side elevation illustrating the device.

Figure 4 is a transverse sectional view taken on the line 4—4 of Figure 3.

Figure 5 is a plan view illustrating a gasket.

Figure 1:
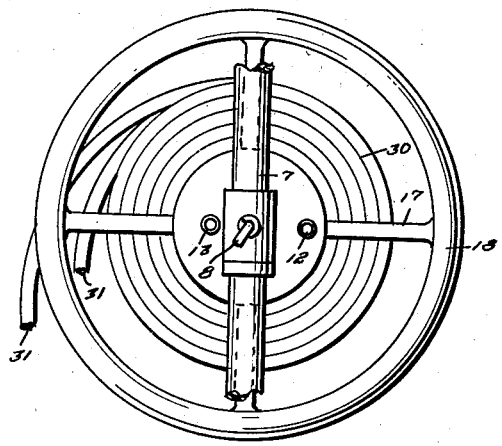
Figure 3:
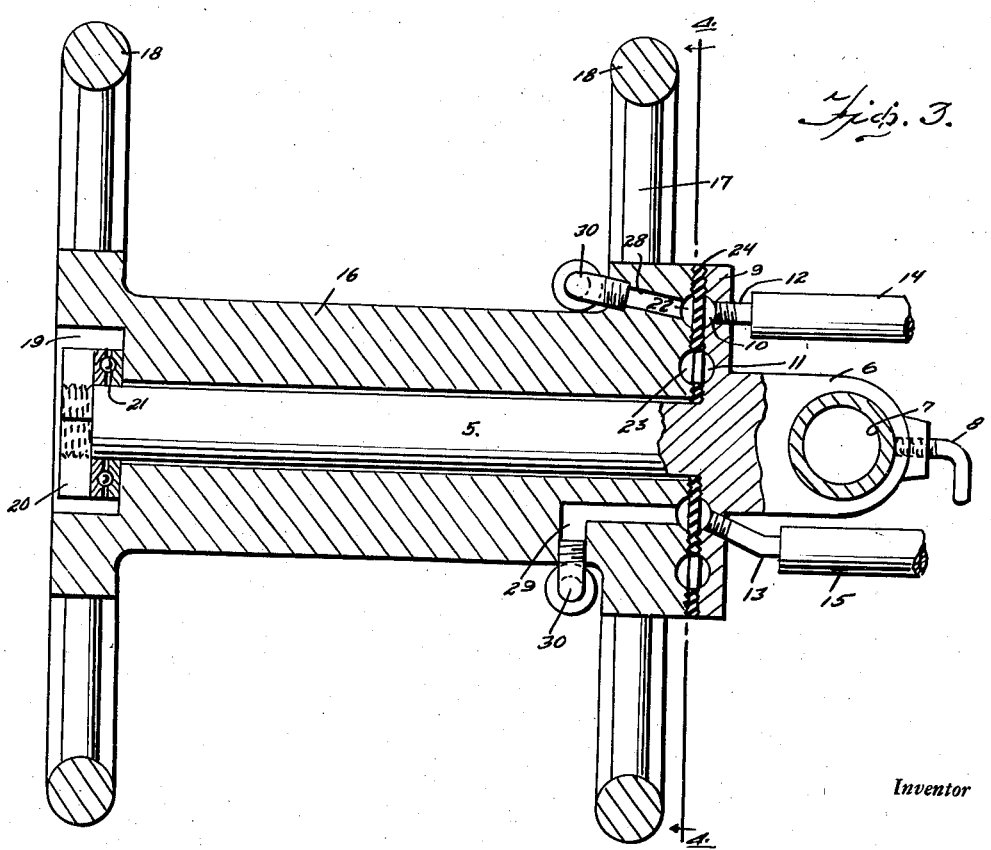
Figure 3 is a vertical sectional view illustrating the reel.

Referring in detail to the drawings, the numeral 5 indicates a supporting shaft enlarged at one end, as shown at 6, and apertured to slidably receive a supporting post 7 which may form a part of a portable welding apparatus (not shown). The enlarged end 6 of the shaft 5 carries a set screw 8 which may be turned in engagement with the post 7 to releasably secure the shaft for either rotation on the post or vertical movement thereon. A supporting collar 9 is releasably secured on the post to engage and support the enlarged end of the shaft 5 on said post.

Integral with the enlarged end 6 of the shaft 5 is a hub plate 9 having formed in one face thereof annular grooves 10 and 11 and threaded into said plate are nipples 12 and 13 to which hose 14 and 15 are connected. The hose 14 is connected to an oxygen supply on the welding apparatus while the hose 15 is connected to an acetylene gas supply on the welding apparatus. The hose 14 and 15 will permit movement of the shaft 5 on the post 7 when necessary to bring the device into different desired operating positions.

Mounted for rotation on the shaft 5 is a hub 16 including radial spokes 17 connecting to said hub annular member 18 which may form hand grips as well as providing end pieces by coacting with the spokes 17 for the reel. One end of the hub 16 is provided with a recess 19 to receive therein a nut 20 threaded on the end of the shaft 5. A thrust bearing 21 is arranged between the nut and the hub. The other end of the hub is enlarged to match the size of the plate 5 and has formed therein annular grooves 22 and 23 arranged opposite the grooves 10 and 11 and mounted on the shaft 5 and positioned between the plate 9 and the latter-named end of the hub is a gasket 24 provided with openings 25 and 26 to place the annular groove 10 in communication with the annular groove 22 and the annular groove 11 in communication with the annular groove 23. By tightening the nut 20 on the shaft 5 will bring the enlarged end of the hub tightly against the gasket and the latter tightly against the plate 9 to prevent leakage. It is preferable that said end of the hub and the opposing face of the plate 9 thereto be provided with a series of annular corrugations in which the gasket may embed to assure against leakage. The annular corrugations are indicated by the character 27.

The hub 16 is provided with passages 28 and 29. The passage 28 connects with the annular groove 22 while the passage 29 connects with the annular groove 23. The passages 28 and 29 have connected thereto nipples 30. Hose 31 are connected to the nipples 30 and to the welding torch (not shown) and are adapted to be wound on and off of the hub of the reel during the use of the device. Thus it will be seen that a very efficient rotatable support adjustable into different positions has been provided for hose employed for conveying oxygen and acetylene gas to a welding torch of a portable welding apparatus without the danger of leakage where said hose must be connected to the hose leading to the sources of supply and still permit rotatable movement of the reel.

A device of this kind will be extremely durable and safe for the conveyance of oxygen and acetylene gas without mixing with one another until arriving at the torch.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a device of the character described, a reel including a hub, a shaft rotatably supporting said hub and having an enlarged end, means for adjustably mounting said end of the shaft on a support, a hub plate formed on the enlarged end of the shaft, a nut threaded on the shaft to retain the hub on the shaft and one end thereof urged toward the hub plate, said latter-named end of the hub having annular grooves, and said hub plate having annular grooves opposite the first-named annular grooves, a gasket interposed between the hub and the hub plate and having ports to communicate the grooves of the hub plate with the grooves of the hub, means for connecting the grooves of the hub plate to sources of supply of acetylene gas and oxygen, hose wound on said hub and adapted for connection to an acetylene welding torch, and means for connecting said hose to the annular grooves of the hub.

2. In a device of the character described, an adjustable support including a shaft and a hub plate having annular grooves therein, a reel including a hub journaled on said shaft and having one end shaped to match the hub plate and provided with annular grooves, said end of the hub and the hub plate having a series of annular corrugations, a gasket interposed between said end of the hub and the hub plate and embedding in said corrugations and provided with ports connecting the grooves of the hub plate with the grooves of the hub, said hub having passages connecting with the grooves thereof, and hose mounted on said hub and connected to said passages and to an acetylene torch.

3. A reel comprising a stationary support, a reel hub rotatably mounted on the support and adapted to have a hose wound thereon, an end plate on the hub having an annular groove in its outer face, passages in the plate connecting the groove with the hose, a plate on the support having one face abutting the outer face of the end plate of the hub, said last-named plate also having an annular groove communicating with the groove of the end plate of the hub, and a feed pipe connected to said groove of the last-named plate.

ELDON L. KRIEG.